(12) United States Patent
Oshikiri

(10) Patent No.: US 7,941,589 B2
(45) Date of Patent: May 10, 2011

(54) SEMICONDUCTOR MEMORY AND INFORMATION PROCESSING SYSTEM

(75) Inventor: Takashi Oshikiri, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 448 days.

(21) Appl. No.: 11/926,533

(22) Filed: Oct. 29, 2007

(65) Prior Publication Data

US 2008/0229002 A1   Sep. 18, 2008

(30) Foreign Application Priority Data

Nov. 30, 2006   (JP) ................................. 2006-322822

(51) Int. Cl.
*G06F 13/00* (2006.01)
(52) U.S. Cl. ................................. 711/103; 711/E12.091
(58) Field of Classification Search .................. None
See application file for complete search history.

(56) References Cited

U.S. PATENT DOCUMENTS

| | | | | |
|---|---|---|---|---|
| 5,406,529 A | * | 4/1995 | Asano | 365/230.03 |
| 2002/0051394 A1 | * | 5/2002 | Tobita et al. | 365/221 |
| 2006/0036804 A1 | * | 2/2006 | Shiota et al. | 711/103 |
| 2007/0101193 A1 | * | 5/2007 | Johnson et al. | 714/25 |
| 2008/0201536 A1 | * | 8/2008 | Hars | 711/154 |
| 2009/0070885 A1 | * | 3/2009 | Mersh | 726/27 |

FOREIGN PATENT DOCUMENTS

JP    2005-108273    4/2005

\* cited by examiner

*Primary Examiner* — Matt Kim
*Assistant Examiner* — Sean Rossiter
(74) *Attorney, Agent, or Firm* — Oblon, Spivak, McClelland, Maier & Neustadt, L.L.P.

(57) ABSTRACT

A semiconductor memory (2) comprises a controller (21) and a memory array (22). The memory array (22) is controlled for each of block areas (221, 221 ... ). The information processing apparatus (1) can not generate a data erase command for each block area (221). A data erase command (30) for a specified block area "G" is encoded and stored in a block area "A". When a request for data erasing is issued, a CPU (11) of the information processing apparatus (1) reads an erase command (30) out from the semiconductor memory (2) and outputs the erase command (30) to the controller (21). The controller (21) decodes the erase command (30) and performs a data erasing process for the block area "G".

16 Claims, 2 Drawing Sheets

SEMICONDUCTOR MEMORY AND INFORMATION PROCESSING SYSTEM

BACKGROUND OF THE INVENTION

1. Field of the Invention

The present invention relates to a technique to protect information stored in a semiconductor memory.

2. Description of the Background Art

Semiconductor memories are widely used to store contents for mobile phones, PDAs (personal digital assistants), game machines or the like. If memories incapable of rewriting data (such as mask ROMs or the like) are used as semiconductor memories, contents stored therein can not be unauthorizedly rewritten. Recently, however, flash memories capable of rewriting data are widely used for data recording in mobile phones, personal computers or the like. Flash memories of higher capacity and lower cost have become widespread and have grown in demand as highly convenient data recording media taking the place of magnetic memory media.

As discussed above, flash memories capable of rewriting data are suitable for and widely used for recording and storing multimedia data. Further, being convenient, the flash memories are considered to be used to store contents for mobile phones, PDAs, game machines or the like.

Since the flash memories have the property of rewriting data, however, it is necessary to protect the stored contents against tampering. Japanese Patent Application Laid Open Gazette No. 2005-108273 discloses a technique to protect rewritable semiconductor memories such as NAND flash memories. The semiconductor memory shown in this document has a construction in which a protect flag is set to some of memory blocks and only if the protect flag indicates a predetermined value, data can be written thereto.

The technique disclosed in Japanese Patent Application Laid Open Gazette No. 2005-108273 is mainly intended for data mis-erase protection. In other words, this is a technique to provide protection against mistakenly erasing of data with a wrong command. Therefore, since data can be written and erased by controlling the protect flag, it is impossible to prevent tampering of data by vicious persons. On the other hand, if the protect flag can not be controlled, it becomes impossible to write or erase data to/from the block and this causes inconvenience.

Further, some semiconductor memories are each provided with a write protect terminal. This technique is intended to provide protection for the entire memory cell and also causes inconvenience.

SUMMARY OF THE INVENTION

The present invention is intended for a semiconductor memory. According to an aspect of the present invention, the semiconductor memory comprises a memory array having a memory area which is controlled on a block-by-block basis, a procedure memory area for storing procedure information on a predetermined process for one block area in the memory array, and a controller receiving an acquisition request for procedure information on the predetermined process for the one block area from an external control device in which a request for the predetermined process for the one block area is issued, for acquiring procedure information on the predetermined process for the one block area from the procedure memory area and giving the acquired procedure information to the control device when the acquisition request is given.

In the present invention, by storing the procedure information in the semiconductor memory, it is possible to permit a predetermined process for a specified block area.

According to another aspect of the present invention, with respect to a block area which does not permit the predetermined process, no procedure information on the predetermined process for the block area exists in the semiconductor memory.

Practically, it is possible to protect the block area.

According to still another aspect of the present invention, the predetermined process includes an erasing process for information on a specified block area.

By the present invention, it is possible to protect data against unauthorized erasing.

Therefore, it is an object of the present invention to provide a technique to use a rewritable semiconductor memory and effectively prevent unauthorized tampering of data.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
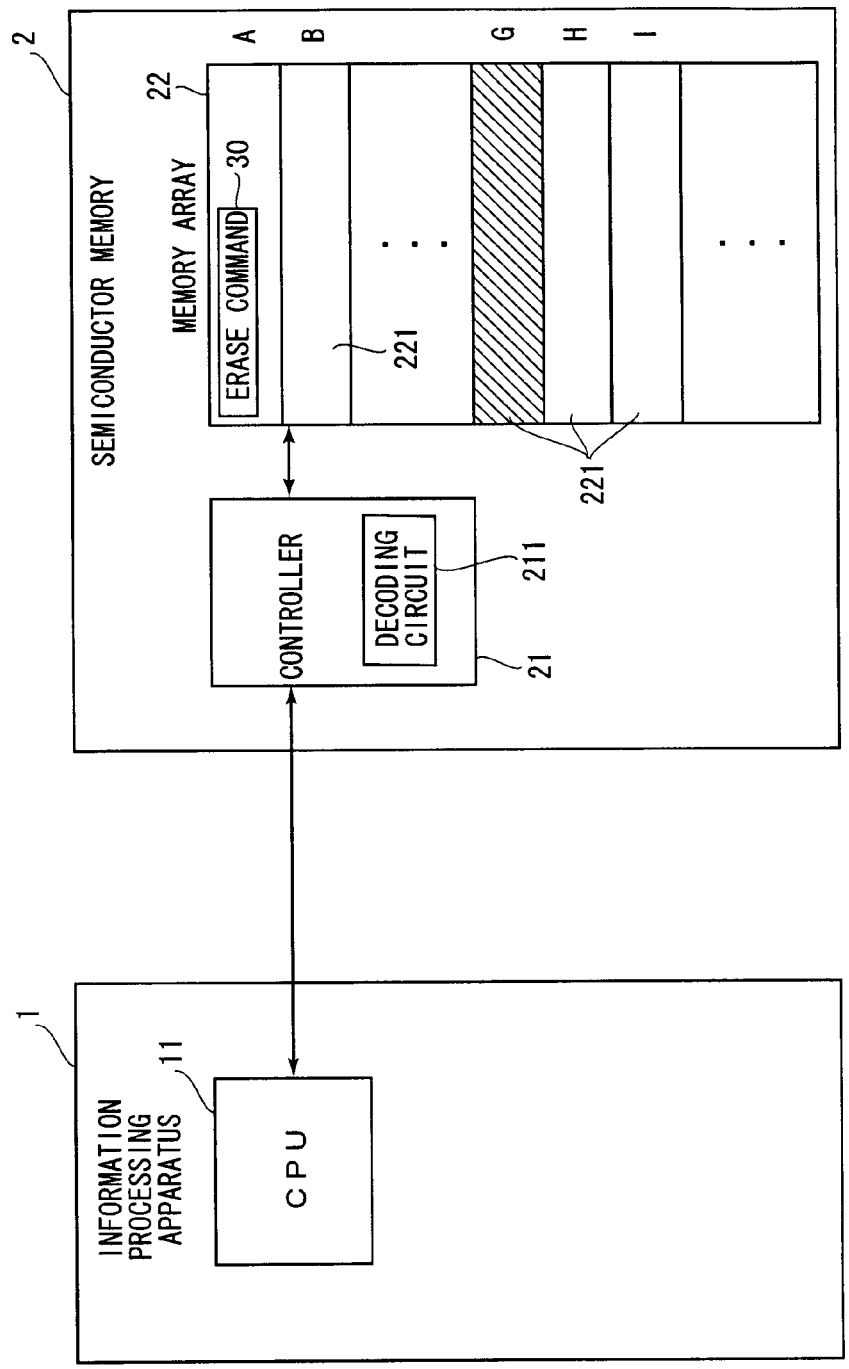
FIG. 1 is a block diagram showing an information processing system in accordance with the present preferred embodiment.

Hereinafter, the preferred embodiment of the present invention will be discussed with reference to figures. FIG. 1 is a block diagram showing an information processing system in accordance with the present preferred embodiment. This information processing system comprises an information processing apparatus 1 and a semiconductor memory 2.

The information processing apparatus 1 comprises a CPU 11 which reads, writes or erases data to/from the semiconductor memory 2. The information processing apparatus 1 performs a variety of information processings on the basis of data read out from the semiconductor memory 2. If the semiconductor memory 2 stores a game program, for example, the information processing apparatus 1 operates as a game device for executing the game program.

The semiconductor memory 2 is a nonvolatile semiconductor memory capable of electrically rewriting data. Specifically, the semiconductor memory 2 of the preferred embodiment is a flash memory. As the flash memory, for example, a NAND flash memory may be used.

The semiconductor memory 2 comprises a controller 21 and a memory array 22 as shown in FIG. 1. The controller 21 controls operations such as reading, writing or erasing data stored in the memory array 22 in accordance with commands, address information or the like inputted from the CPU 11.

Further, the controller 21 comprises a decoding circuit 211. The decoding circuit 211 is used to decode encoded commands.

The memory array 22 is divided into a plurality of block areas 221, 221 . . . , as shown in FIG. 1. In FIG. 1, block area names "A", "B" . . . are given to the respective block areas 221, 221 . . . , for easy-to-understand illustration. As discussed above, the semiconductor memory 2 of the preferred embodiment is a flash memory and data can be erased on a block-by-block basis.

Further, the semiconductor memory 2 of the preferred embodiment has a construction in which an erase command for erasing data in a specified block area 221 is stored in the memory array 22. The erase command is encoded and stored in the memory array 22. In the exemplary construction of FIG. 1, an erase command 30 for a shaded block area "G" is stored in a block area "A", being encoded.

No information on data erasing procedure for each of the block areas 221, 221... in the memory array 22 is given to the information processing apparatus 1 or the CPU 11 which makes access to the semiconductor memory 2. Further, the data erasing procedure for each of the block areas 221, 221... in the semiconductor memory 2 is not opened. In other words, the information processing apparatus 1 or the CPU 11 can not generate a data erase command for any one block area 221. In order to erase data stored in any one of the block areas 221, 221..., it is necessary to acquire the command therefor from the memory array 22.

Further, the erase command 30 stored in the memory array 22 is encoded, as discussed above. Therefore, the information processing apparatus 1 or the CPU 11 can perform a data erasing process for the block area "G" by acquiring the erase command 30 from the semiconductor memory 2 but can not analyze the process since it performs the process with the encoded erase command 30. In other words, by acquiring the encoded erase command 30, it is possible to perform the data erasing process for the block area "G" but impossible to analogize the data erase command for any of other block areas 221, 221... from the acquired erase command 30.

Figure 2:
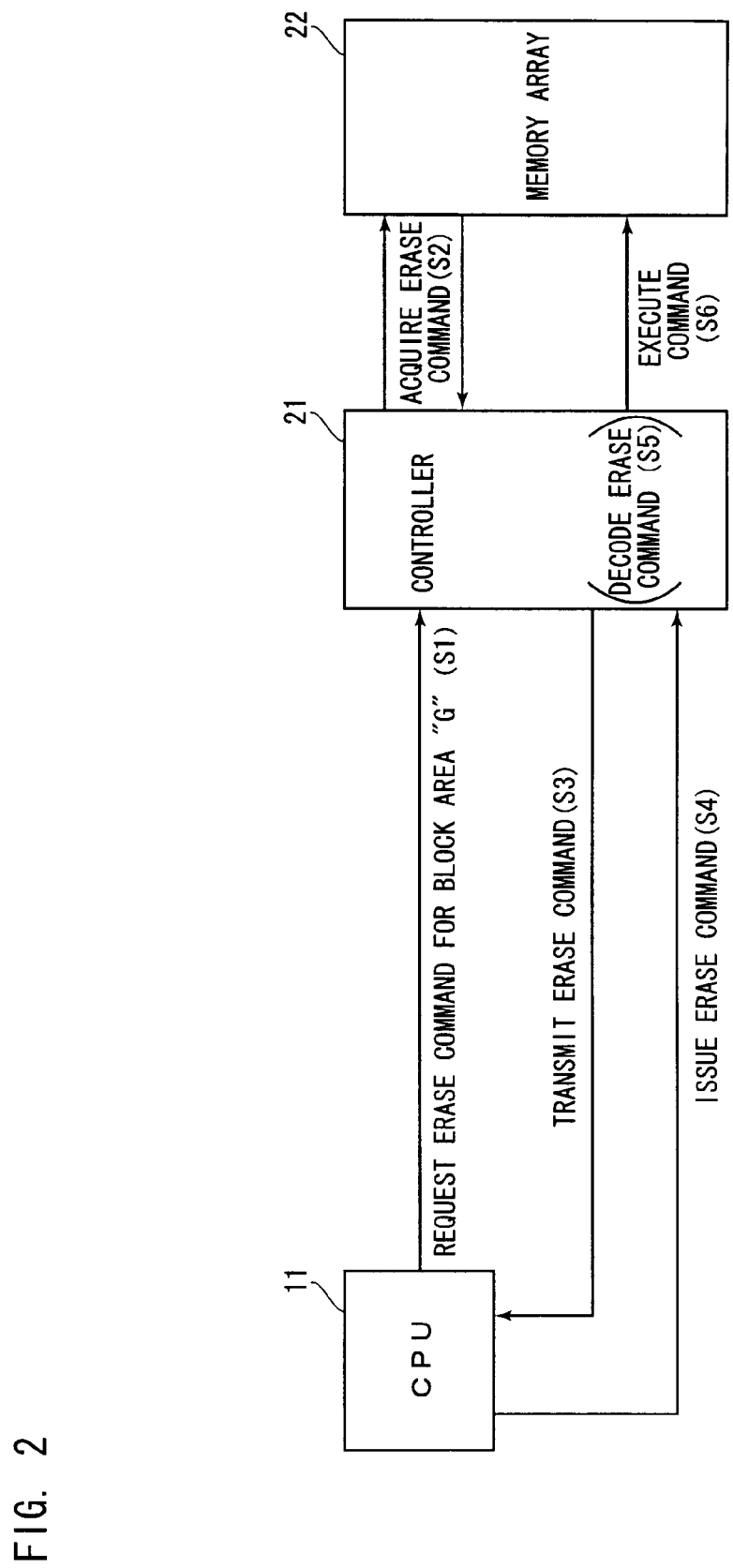
FIG. 2 is a view showing procedural steps of a data erasing process for a specified block area.

Now, discussion will be made on an operation flow of the data erasing process in the information processing system having the above-described construction, with reference to FIG. 2. Herein, a process for erasing data in the block area "G" shown in FIG. 1 will be taken as one example for discussion.

First, the CPU 11 issues a request for erasing data in the block area "G". The CPU 11 can not generate a command for erasing data in any one block area 221 in the memory array 22. Then, the CPU 11 issues a read request of the erase command 30 for the block area "G" to the controller 21 (Step S1).

Receiving the read request of the erase command 30 from the CPU 11, the controller 21 acquires the erase command 30 from the memory array 22 (Step S2). The erase command 30 for the block area "G" is stored in the block area "A" in the memory array 22, as shown in FIG. 1. The erase command 30 is encoded.

Next, the controller 21 transmits the acquired erase command 30 to the CPU 11 (Step S3). At that time, the controller 21 transmits the encoded erase command 30 to the CPU 11 without decoding.

Acquiring the erase command 30 from the controller 21, the CPU 11 issues the acquired erase command 30 (Step S4). In other words, the CPU 11 outputs the encoded erase command 30 to the controller 21. Thus, the CPU 11 acquires the erase command 30 for the block area "G" from the semiconductor memory 2 but can not analyze the erasing procedure since it uses the erase command 30 being encoded.

Receiving the erase command 30 from the CPU 11, the controller 21 uses the decoding circuit 211 to decode the erase command 30 (Step S5). Then, the controller 21 executes the decoded command (Step S6). Specifically, the controller 21 performs a data erasing process for the block area "G" in the memory array 22. With this operation, the data in the block area "G" is erased.

Thus, in the information processing system of the preferred embodiment, a command for erasing data in the block area 221 is stored in the memory array 22. Any external control device (the CPU 11 of the preferred embodiment) can not generate the command for erasing data in each block area 221. Therefore, in order to erase data in any one block area 221, it is necessary to store a command for erasing data in another specified block area 221 in the memory array 22. Conversely, with respect to a block area 221 for which no command for erasing is provided, it is practically impossible to erase data.

Further, the erase command 30 stored in the memory array 22 is encoded. Therefore, the external control device, even if acquires the erase command 30, can not analogize a command for erasing data in any other block area 221 from the acquired erase command 30. In other words, a data erasing operation is permitted only for the block area 221 whose data can be erased by the provided erase command 30.

If the information processing apparatus 1 is a game device, for example, the following usage is considered. A game program is stored in the semiconductor memory 2. The data erasing operation for the block area 221 in which the game program is stored should not be permitted in order to prevent unauthorized tampering of data by any user. Therefore, a data erase command for the block area 221 in which the game program is stored is not provided in the memory array 22. This practically makes tampering of the game program impossible.

On the other hand, there are game programs whose proceeding data, profile data and the like must be backed up. In such a case, an erase command for a block area 221 in which the backup data is stored is made and stored in the memory array 22. The game device can thereby write the backup data to the block area.

Thus, in the preferred embodiment, it is possible to freely allocate a data inerasable area and a data erasable area in one memory array 22.

In the preferred embodiment as discussed above, an erase command for a block area 221 is encoded and stored in the memory array 22. This makes it possible to protect data against unauthorized erasing. The present invention can be applied to a read command and a write command as well as the erase command.

A write command for the block area "G", for example, is encoded and stored in the memory array 22. The external control device can not generate a data write command for each block area 221. In other words, a command for writing data is not opened. The external control device can not write data until it acquires the write command for the block area "G" stored in the memory array 22. Moreover, the external control device can not write data to any other block area 221. This practically makes it impossible to write data in any block areas other than the block area 221 for which a write command is provided in the memory array 22.

Similarly, a read command for a specified block area is encoded and stored in the memory array 22. Then, a read command for each block area is not opened. This makes it possible to read data in the specified block area and practically makes it impossible to read data in any other block area. Only an area in which the read command is stored may be set as a freely-readable area (further, data in the area may be set inerasable).

The above discussion has been made on the case where the erase command or the write command for the block area "G" is stored in the memory array 22. In other words, the erase command, the write command and the read command are used for block areas of the same unit. The erase command, the write command and the read command, however, may be used for block areas of different units. If a NAND flash memory is used, for example, the unit for writing and reading is a page (2 KByte). On the other hand, the unit for erasing is a block (128 pages). Therefore, if a NAND flash memory is used, as to commands for writing or reading, the write command or the read command for a specified page may be stored in the memory array 22. As to commands for erasing, the erase command for a specified block (consisting of a plurality of pages) may be stored in the memory array 22.

In the above-discussed preferred embodiment, the encoded erase command 30 is stored in the memory array 22. The above discussion has been made on the case where the write command and the read command are similarly encoded and then stored. Encoding of commands, however, is one example. The necessary condition is that the information stored in the memory array 22 can be used as a command for a specified block area but commands for other block areas can not be analogized from this information.

The above-discussed erase command 30 is encoded. Then, the CPU 11 acquires the encoded erase command 30 and issues the encoded erase command 30 without decoding. Therefore, the external control device can not analogize an erase command for any other block area. Similarly, even if the erase command is not encoded, the erase command has only to be a command which can be used for a specified block area and does not have information from which a command for any other block area can be easily generated. The erase command 30 may include, for example, a setting parameter to be given to the controller 21 or the block area 221.

Further, in the above-discussed preferred embodiment, the erase command 30 is stored in the memory array 22. An area for storing the erase command 30, however, is not limited to the memory array 22. The erase command 30 may be stored in another storage medium provided in the semiconductor memory 2. There may be a case, for example, where an EEPROM capable of being freely accessed for reading is provided in the semiconductor memory 2 and the erase command 30 or the like is stored therein.

Thus, in the present invention, it is possible to freely provide permission for erasing or protection against erasing for each block area in the memory array of the semiconductor memory. Similarly, it is possible to provide permission for writing or protection against writing, or permission for reading or protection against reading for each block area. Providing the permission or protection can be implemented by storing a command for the predetermined process in the memory array 22 or the like at the same time when data such as contents is written into the semiconductor memory and this has high degree of flexibility and convenience, unlike the control by hardware.

While the invention has been shown and described in detail, the foregoing description is in all aspects illustrative and not restrictive. It is therefore understood that numerous modifications and variations can be devised without departing from the scope of the invention.

What is claimed is:

1. A semiconductor memory, comprising:
   a memory array including,
      a plurality of memory block areas which are controlled on a block-by-block basis; and
      a procedure memory area for storing procedure information on a predetermined process to be executed on only one of the plurality of memory block areas in said memory array; and
   a controller
      to receive an acquisition request for procedure information on said predetermined process to be executed on only said one of the plurality of memory block areas from an external control device in which a request for said predetermined process to be executed on only said one of the plurality of memory block areas is issued, and
      to acquire procedure information on said predetermined process to be executed on only said one of the plurality of memory block areas from said procedure memory area and giving said acquired procedure information to said external control device when the acquisition request is given, wherein
   the procedure information on said predetermined process to be executed on only said one of the plurality of memory block areas is encoded before said procedure information is given by said controller to said external control device to prevent said external control device from analyzing said procedure information, and
   said external control device sends the encoded procedure information to said controller for decoding the encoded procedure information and for executing said predetermined process on only said one of the plurality of memory block areas.

2. The semiconductor memory according to claim 1, wherein
   with respect to another one of the plurality of memory block areas which does not permit execution of said predetermined process, no procedure information on said predetermined process to be executed on the another one of the plurality of memory block areas exists in said semiconductor memory.

3. The semiconductor memory according to claim 1, wherein
   said predetermined process includes an erasing process for information on a specified memory block area.

4. The semiconductor memory according to claim 3, wherein
   procedure information on said predetermined process includes an erase command for information on a specified memory block area.

5. The semiconductor memory according to claim 1, wherein
   said predetermined process includes a writing process for information on a specified memory block area.

6. The semiconductor memory according to claim 5, wherein
   procedure information on said predetermined process includes a write command for information on a specified memory block area.

7. The semiconductor memory according to claim 1, wherein
   said predetermined process includes a reading process for information on a specified memory block area.

8. The semiconductor memory according to claim 7, wherein
   procedure information on said predetermined process includes a read command for information on a specified memory block area.

9. An information processing system, comprising:
   an information processing apparatus including a control device; and
   a semiconductor memory, wherein
   said semiconductor memory includes,
      a memory array including,
         a plurality of memory block areas which are controlled on a block-by-block basis;

a procedure memory area for storing procedure information on a predetermined process to be executed on only one of the plurality of memory block areas in said memory array; and a controller for controlling access to said memory array, said control device includes, means for issuing a read request for procedure information on said predetermined process to be executed on only said one of the plurality of memory block areas to said controller when a request for said predetermined process to be executed on only said one of the plurality of memory block areas is issued to the control device, and said controller includes, means for receiving said request for said procedure information on said predetermined process to be executed on only said one of the plurality of memory block areas issued by said control device;

means for acquiring procedure information on said predetermined process to be executed on only said one of the plurality of memory block areas from said procedure memory area, and for providing the acquired procedure information to said control device in response to the read request from said control device, wherein the procedure information on said predetermined process to be executed on only said one of the plurality of memory block areas is encoded before said procedure information is given by said controller to said control device to prevent said control device from analyzing said procedure information, and said control device sends the encoded procedure information to said controller for decoding the encoded procedure information and for executing said predetermined process on only said one of the plurality of memory block areas.

10. The information processing system according to claim 9, wherein with respect to another one of the plurality of memory block areas which does not permit execution of said predetermined process, no procedure information on said predetermined process to be executed on the another one of the plurality of memory block areas exists in said semiconductor memory.

11. The information processing system according to claim 9, wherein said predetermined process includes an erasing process for information on a specified memory block area.

12. The information processing system according to claim 11, wherein procedure information on said predetermined process includes an erase command for information on a specified memory block area.

13. The information processing system according to claim 9, wherein said predetermined process includes a writing process for information on a specified memory block area.

14. The information processing system according to claim 13, wherein procedure information on said predetermined process includes a write command for information on a specified memory block area.

15. The information processing system according to claim 9, wherein said predetermined process includes a reading process for information on a specified memory block area.

16. The information processing system according to claim 15, wherein procedure information on said predetermined process includes a read command for information on a specified memory block area.

* * * * *